United States Patent
Flum et al.

(10) Patent No.: US 8,153,883 B2
(45) Date of Patent: Apr. 10, 2012

(54) ROTARY CONTROL DEVICE FOR MANIPULATING DIGITAL AUDIO SIGNALS

(75) Inventors: Alan Flum, Ridgefield, WA (US); James Mazur, Woodland Hills, CA (US)

(73) Assignee: Gibson Guitar Corp., Nashville, TN (US)

( * ) Notice: Subject to any disclaimer, the term of this patent is extended or adjusted under 35 U.S.C. 154(b) by 905 days.

(21) Appl. No.: 12/220,759

(22) Filed: Jul. 28, 2008

(65) Prior Publication Data

US 2010/0020673 A1     Jan. 28, 2010

(51) Int. Cl.
*G10H 1/32* (2006.01)
*G10H 1/02* (2006.01)

(52) U.S. Cl. ............. 84/743; 84/725; 84/737; 84/4
(58) Field of Classification Search ........ 84/743
See application file for complete search history.

(56) References Cited

U.S. PATENT DOCUMENTS

| | | | |
|---|---|---|---|
| 6,541,690 B1 * | 4/2003 | Segers, Jr. .............. 84/605 |
| 7,072,249 B2 * | 7/2006 | Huang | |
| 2005/0127309 A1 * | 6/2005 | Spencer ................. 250/557 |
| 2005/0270926 A1 * | 12/2005 | Mazur et al. ............ 369/47.1 |
| 2006/0161941 A1 * | 7/2006 | Liu ......................... 720/695 |

OTHER PUBLICATIONS

AS5045 12 Bit Programmable Magnetic Rotary Encoder Data Sheet, Oct. 3, 2006, Revision 1.2, Austriamicrosystems AG, Austria.

* cited by examiner

*Primary Examiner* — Elvin G Enad
*Assistant Examiner* — Christopher Uhlir
(74) *Attorney, Agent, or Firm* — Alan M. Flum; Stone Creek LLC

(57) ABSTRACT

The disclosure relates to control and audio manipulation of a digital audio signal by a user manipulable rotary control. The disclosure is specifically applicable to manipulation of a digital audio signal by disc jockeys (DJs). A magnet and corresponding sensor are used to obtain rotational state information from the turning of the user manipulable rotary control. This rotational state information is used to manipulate a digital audio signal. Manipulation of the digital audio includes forward and backward motion as well as a "scratch effect". Rotational state information obtained from rotating magnet includes the possibility of absolute rotation position as well as relative rotational position, or rotational direction.

17 Claims, 9 Drawing Sheets

ROTARY CONTROL DEVICE FOR MANIPULATING DIGITAL AUDIO SIGNALS

BACKGROUND OF THE INVENTION

1. Field of the Invention

The present invention pertains to the field of control and audio manipulation of a digital audio signal by a user manipulable rotary control. The present invention is specifically applicable to manipulation of a digital audio signal by disc jockeys (DJs).

2. Description of the Prior Art

Scratch effects controllers for DJing has been come a popular replacement by DJs for conventional turntable and phonographic LP records for producing a scratch effect or to generally manipulate the speed and direction of music.

On a conventional turntable with a phonographic record, the DJ manipulates the rotating phonographic record by hand with a backward and forward motion to produce a scratch effect or to otherwise manipulate the speed and direction of the music playing on the phonographic record. Under normal use, i.e. when the user is not manipulating the phonographic record, a motor driven platter will rotate the record. When the user manipulates the record, the record will generally move independently of the rotating platter because there is slippage between the record and the platter surface.

Scratch effects controllers have been developed to simulate this user manipulation of a vinyl record on a phonographic turntable. Instead of a turntable, phonographic record, needle, and magnet cartridge, the scratch effect controller generally contains a user rotatable member. This user rotatable member can come in a variety of forms including a vinyl disc, metal or plastic platter, or a jog wheel. The surface is capable of freely rotating either clockwise or counter clockwise. There is generally some type of optical encoder and optical sensor operationally attached to the user rotatable member to detect speed, relative position, and direction of rotation. Some controllers try to more accurately simulate the functionality of a conventional phonographic turntable by having a rotatable platter under the user rotatable member. This platter is often driven by a motor in order to simulate the motion and feel of phonographic turntable platter. In this arrangement, the motion of the user rotatable member is detected by an optical encoder/sensor combination.

Some devices have incorporated an optical encoder pattern directly on the underside of the user rotatable member. For example, see U.S. Pat. No. 6,541,690 to Segers. Other devices mount the optical encoders below the surface of the rotating platter. For example, see U.S. Pat. No. 7,072,249 to Huang.

All of the above described controller devices have deficiencies in that highly accurate encoders are expensive, optical encoders are susceptible to dust, dirt and smoke, most optical encoder systems are only capable of detecting relative position, while detection of absolute position is desirable.

OBJECTS AND SUMMARY OF THE INVENTION

It is therefore an object of the present invention to provide an improved user manipulable rotary control device for manipulating digital audio signals. It is a further object of this present invention to provide an improved user manipulable rotary control device for imparting a scratch effect on a digital audio signal.

This and other objects are attained by the present disclosure which discloses a user manipulable rotary control device for manipulating digital audio signals that uses a magnet with an associated detector for determining the rotational state of a user rotatable member. Rotational state includes absolute rotational position, velocity, relative rotational position or relative rotational direction.

In one embodiment, a user rotatable member is operatively connected to a magnet so that rotational movement of the user rotatable member creates a corresponding rotation of the magnet. A detector is used to determine the rotational state of the magnet. A processing means manipulates digital audio information based on the rotational state information. The processing means is typically a digital signal processor (DSP) but could also be a microcontroller, microprocessor, field programmable logic device (FGPA) and similar devices adapted to receive and process digital audio signals. The processing means, user rotatable member, and detector can be contained all within one enclosure. It is also possible that the processing means is contained within a personal computer, media player, or other remote device. The processing means, in that case, could be the remote device's processor, such as a computer's CPU, running a software program adapted to manipulating digital audio signal from an external control signal.

In another embodiment, the user rotatable member impinges and rotates on the same axis as a platter. The platter may be adapted to rotate by user manipulation independently of the user rotatable member. The platter may also be driven by a motor. In that case, without user interaction with the user rotatable member, the platter and user rotatable member will both be rotated by the motor. When the user interacts with the user rotatable member, the user rotatable member will move independently from the platter. As in the previous embodiment, a magnet and corresponding detector are used to determine the rotational state of the user rotatable member. Processing means, such as a DSP, microprocessor, or gate array, manipulates digital audio information based on rotational state information. The processor, user rotatable member, platter, motor, and detector can be contained all within one enclosure. It is also possible that the processing means is contained within a personal computer, media player, or other remote device. In the later case, a controller can be used to translate the rotational state of the user rotatable member into standard computer protocol such as USB, MIDI over USB, FireWire, or a wireless protocol.

In embodiments that include platters or platters with motors, it is also desirable to obtain rotational state information of the platter. This information can be used, for example, in a motor control circuit in order to stabilize the motor's speed. It can also be used by the processing means to determine the user manipulation of the user rotatable member relative to the rotation of the platter. Alternatively, a controller, adapted to converting the rotational state information from the user rotatable member into standard computer protocol, could be adapted to instead convert the difference in the rotation states of user rotatable member and platter into standard computer protocol. The rotational state of the platter can be determined by either a conventional optical encoder and optical sensor or combination of a magnet and detector.

DESCRIPTION OF THE DRAWINGS

Further objects and advantages of the invention will become apparent from the following description and from the accompanying drawings, wherein.

DETAILED DESCRIPTION OF THE PREFERRED EMBODIMENT

Figure 1:
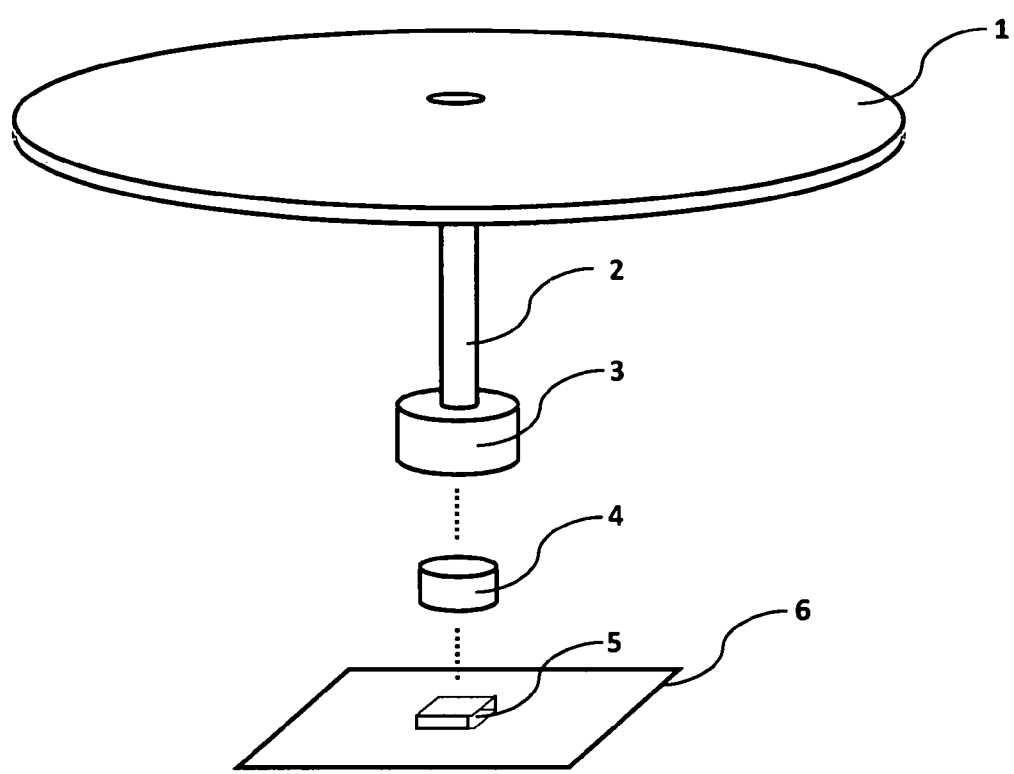
FIG. 1 is a partially exploded perspective view of a typical embodiment of the present invention.
Figure 8:
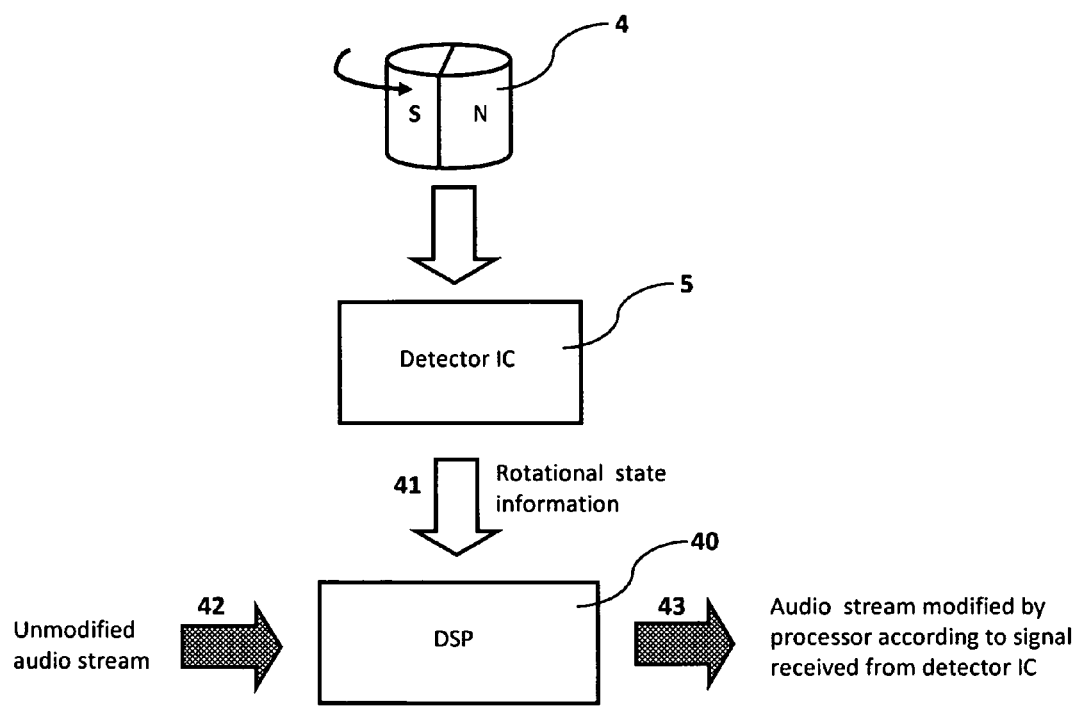
FIG. 8 is a block diagram of a typical embodiment of the present invention.

Referring now to the drawings in detail, wherein like numerals indicate like elements throughout the several views, one sees that FIG. 1 discloses an embodiment of the present invention. A user rotatable member 1, is operatively connected to a shaft 2. At the opposite end of the shaft where the user rotatable member is connected is a provision for mounting a magnet 3. A cylindrical magnet 4 is mounted inside the mounting provision. Referring to FIG. 8, the magnet 4 is so arranged so that the north and south poles are on opposite sides of the half circle that form along the cross section of the cylinder. While a cylindrical shape is desirable, other shapes are possible.

Again, referring to FIG. 1, a detector integrated circuit 5 is mounted underneath the bottom surface of the magnet. The detector integrated circuit is mounted on a printed circuit board 6. The detector integrated circuit contains an array of Hall Effect transistors, an amplifier, a digital signal processor, and a serial interface. A typical example of this arrangement is disclosed in Austria Microsystems "AS5045 12 Bit Programmable Magnet Rotary Encoder Datasheet", which is hereby incorporated by reference.

While it is desirable to have all of these elements contained within a single integrated circuit, it is possible to have only the hall effect transistor array mounted directed under the magnet with a separate amplifier, digital signal processor, and serial interface mounted remotely.

The output of the detector integrated circuit 5 produces absolute rotational position data. Those skilled in the art will be able to recognize that rotational direction information and relative rotational position information can be derived from the absolute position information. It is also possible to produce relative rotational position, rotational direction, or velocity data directly from this arrangement.

Referring to the block diagram of FIG. 8, a processor is configured to receive and process audio signals. The processor has program and data memory associated with it. This memory may be either internal or external to the processor. This processor is typically a digital signal processor (DSP) but may be a general purpose microcontroller or even a field programmable gate array (FPGA) capable of manipulating audio information in real-time. The audio signal typical comes from a storage device (not shown) such as a hard drive, flash memory, or removable storage such as a CD or DVD disc. The rotational state information is determined by the detector integrated circuit 5 is used by the processor 40 to manipulate the audio. Typical manipulation of the digital audio signal includes imparting a scratch effect, slowing down, speeding up, or reversing direction of the audio stream. The processor 40 does this by comparing the information provided by the detector integrated circuit 5 to the expected rotational state that is stored in the processor's memory.

Figure 9:
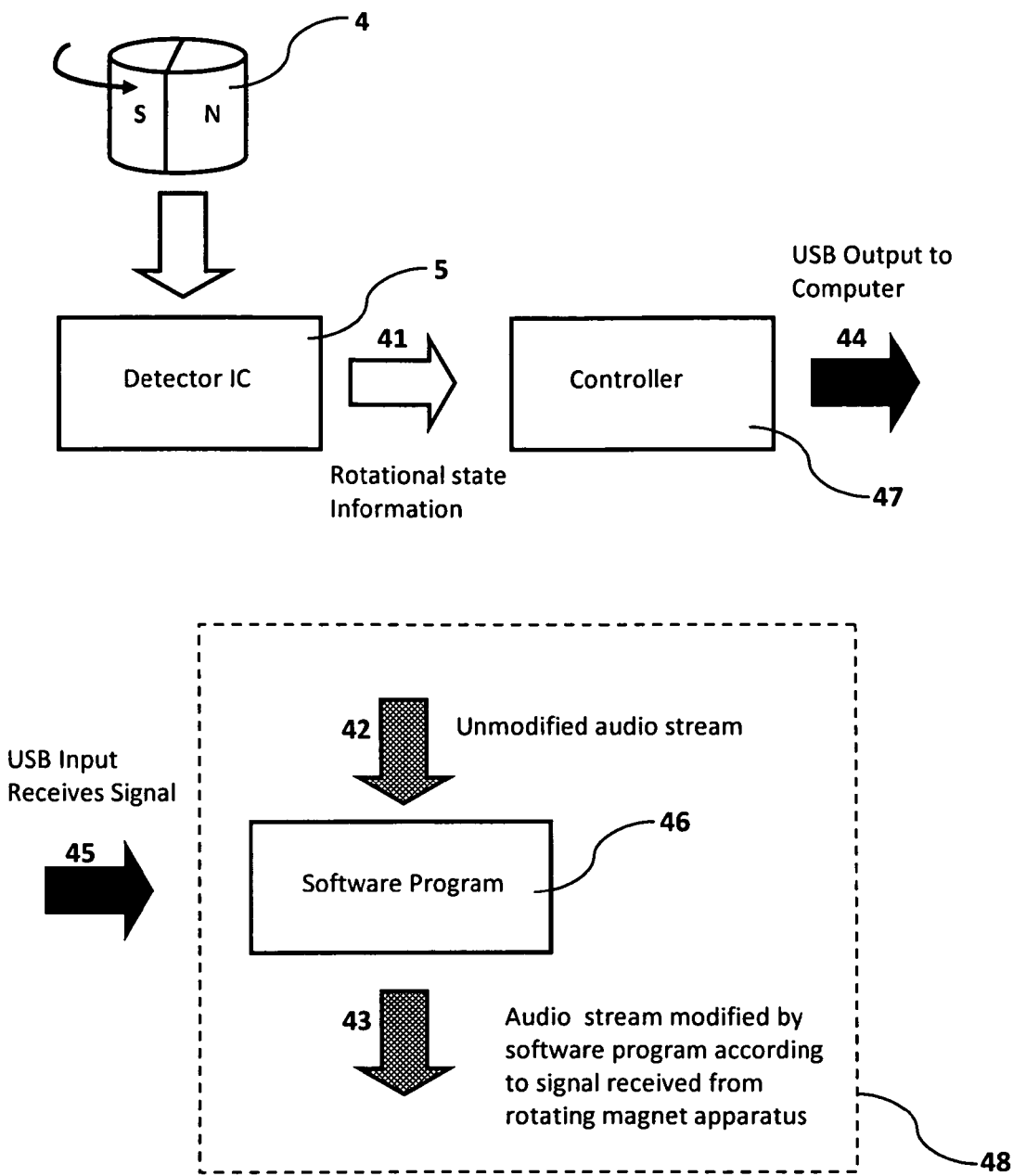
FIG. 9 is a block diagram of an embodiment of the present invention where the audio processing takes place inside a personal computer.

Referring to FIG. 9, the means for processing the digital audio signal is contained in a personal computer, portable media player, or other external device disposed for manipulating a digital audio from information derived from an external control signal 48. The detector integrated circuit 5 sends information concerning the current rotation state of the user rotatable member to a controller 47. The controller 47, is typically a microcontroller but can be a dedicated transmission protocol processor or even be contained within the detector integrated circuit 5.

The controller 47 translates the rotational state information into a standard computer protocol for transmission and uses a corresponding port 44 to the external device 48 disposed for manipulating a digital audio signal. The transmission protocol could be MIDI over USB, Ethernet, FireWire, wireless 802.11, wireless 802.15 or other protocols recognized by those familiar with the art as being disposed toward transmitting control information for manipulation of a digital audio signal. The external device 48 receives the control signal through a port disposed to receiving a computer protocol signal 45. Typically a low level driver program or software within the device's operating system receives the control signal. The external device 48, runs a software program 46, within its processor, the software program designed to manipulate digital audio data. This software program 46 uses the data stream from the received control signal to impart a scratch effect, slow down, speed up, or reverse direction of the audio stream. This is accomplished in a similar manner as described in the previous paragraph.

Several embodiments of the arrangement of the magnetic rotational detection scheme are shown in FIGS. 2 through 7.

Figure 2:
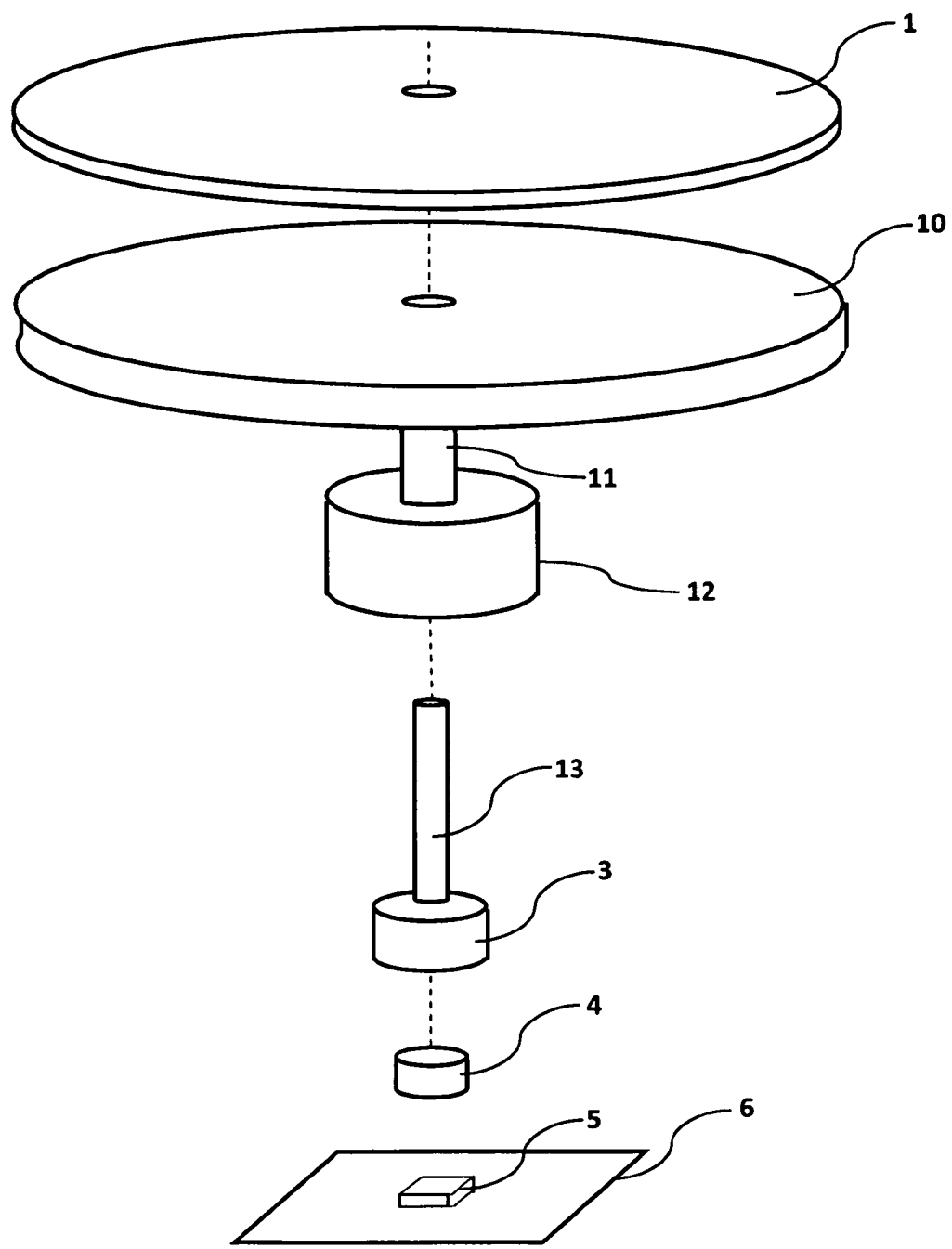
FIG. 2 is a partially exploded perspective view of an embodiment of the present invention that includes a motor driven platter. The user rotatable platter is shown in typical relation to the platter.

Referring to FIG. 2, the user rotatable member 1 impinges against a motor driven platter 10. The purpose of this platter is to simulate the feel of phonographic turntable platter. In this embodiment, the motor is operatively connected to the platter through a hollow shaft 11. The center of the motor 12 is also hollow so it is capable of receiving a concentric inner shaft 13. The inner shaft 13 and outer shaft 11 are separated by a bearing. The inner shaft 13 is operatively connected to the user rotatable member 1 on one end, and the magnet 4 on the other end. The magnet 4 is coupled to the shaft through a mounting provision 3. Because the magnet and user rotatable member are operatively connected through the inner shaft 13, rotation by the user of the user manipulable member 1, creates a corresponding rotation of the magnet 4. Under normal operation, where there is no user interaction, the user rotatable member 1 and platter 10 rotate together. This is accomplished by friction between the two surfaces. When the user manipulates the user rotatable member 1, the force of the user's movements will overcome the force of friction and the user rotatable member 1 will turn independently of the motorized platter 10. A slip disc made of felt or plastic (not shown) can be placed between the platter 10 and the user rotatable member 1 to accommodate slippage, however, the material of either the platter 10 or the user rotatable member 1 may facilitate this without the need of a slip disc. The detector integrated circuit 5 detects the rotational state of the user rotatable member 1 by virtue of detecting the rotational state of the magnet 4. The detector integrated circuit 5 may also be disposed toward determining absolute rotational position, relative rotational position, or rotational direction as previously disclosed.

Figure 3:
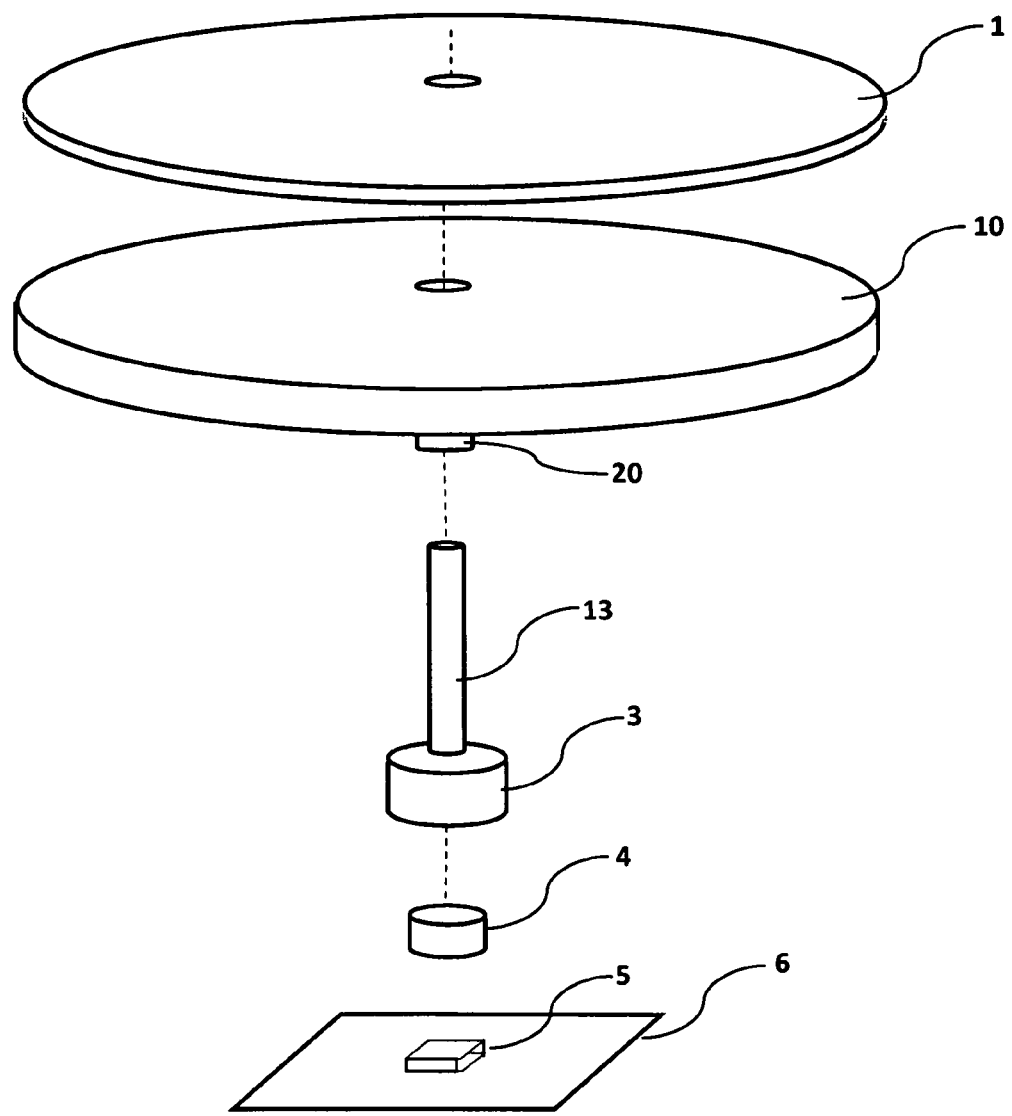
FIG. 3 is a partially exploded perspective view an embodiment of the present invention that includes a platter. The user rotatable member is shown in typical relation to the platter.

Referring to FIG. 3, the user rotatable member 1 impinges against a platter 10. In this embodiment, the platter 10 is freely rotatable. As previously described, the magnet 4 and user rotatable member 1 are operationally connected to a shaft 13 on opposite ends. The detector integrated circuit 5 derives rotational state information from the magnet 4. A bearing 20 mounted in center of the platter 10, allows the rotatable member 1 and shaft 13 to rotate independently from the platter 10 when the user manually rotates the rotatable member 1.

Figure 4:
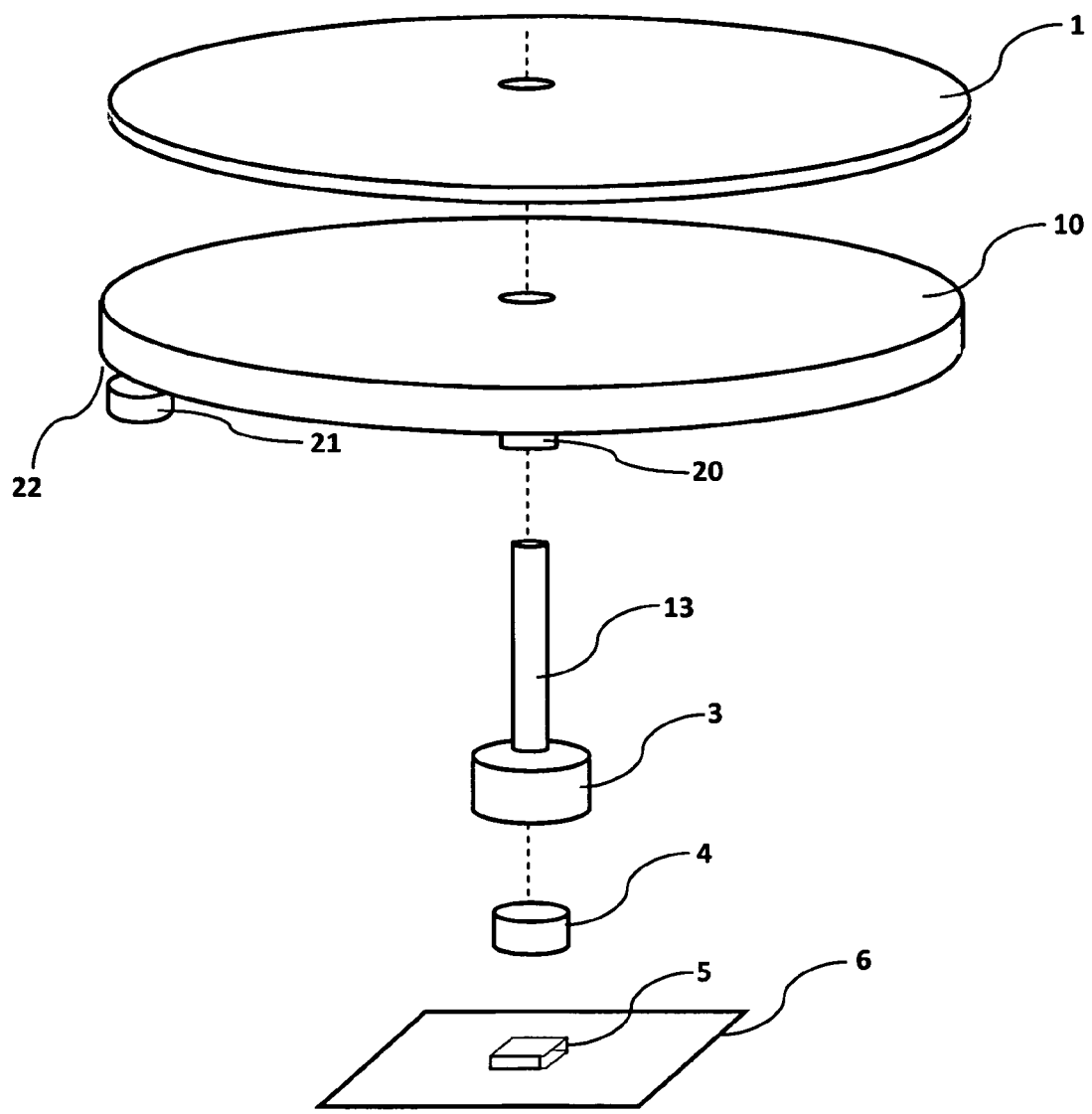
FIG. 4 is a partially exploded perspective view of an embodiment of the present invention that includes a platter illustrating an optical encoder and detector for determining the rotational position and rotational direction of the platter. A magnet detection scheme is used to determine the rotational position and rotational direction of the user rotatable member.

Often it is desirable to detect the movement of the platter and the movement of the user rotatable member separately. Referring to FIG. 4, this embodiment shows an arrangement similar to that shown in FIG. 3 with the addition of an optical encoder 22 and optical encoder sensor 21 which are used to determine the movement of the platter 10. The optical encoder 22 consists of a pattern at the underside of the platter with the optical encoder sensor 21 reading the light and dark patterns.

Figure 5:
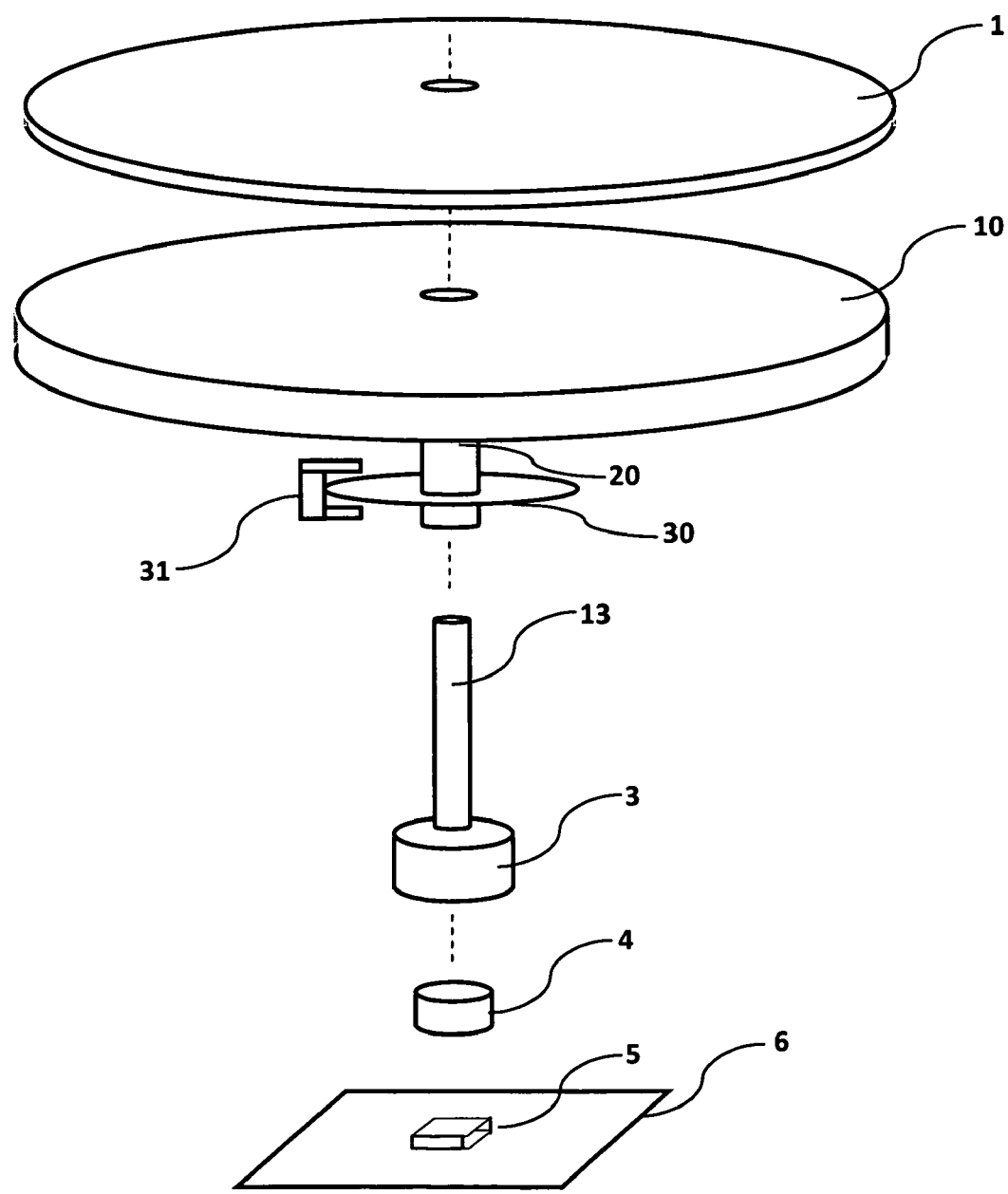
FIG. 5 is a partially exploded perspective view an embodiment of the present invention that includes a platter with an optical encoder and sensor use to determine the rotational position and rotational direction of the platter.
Figure 6:
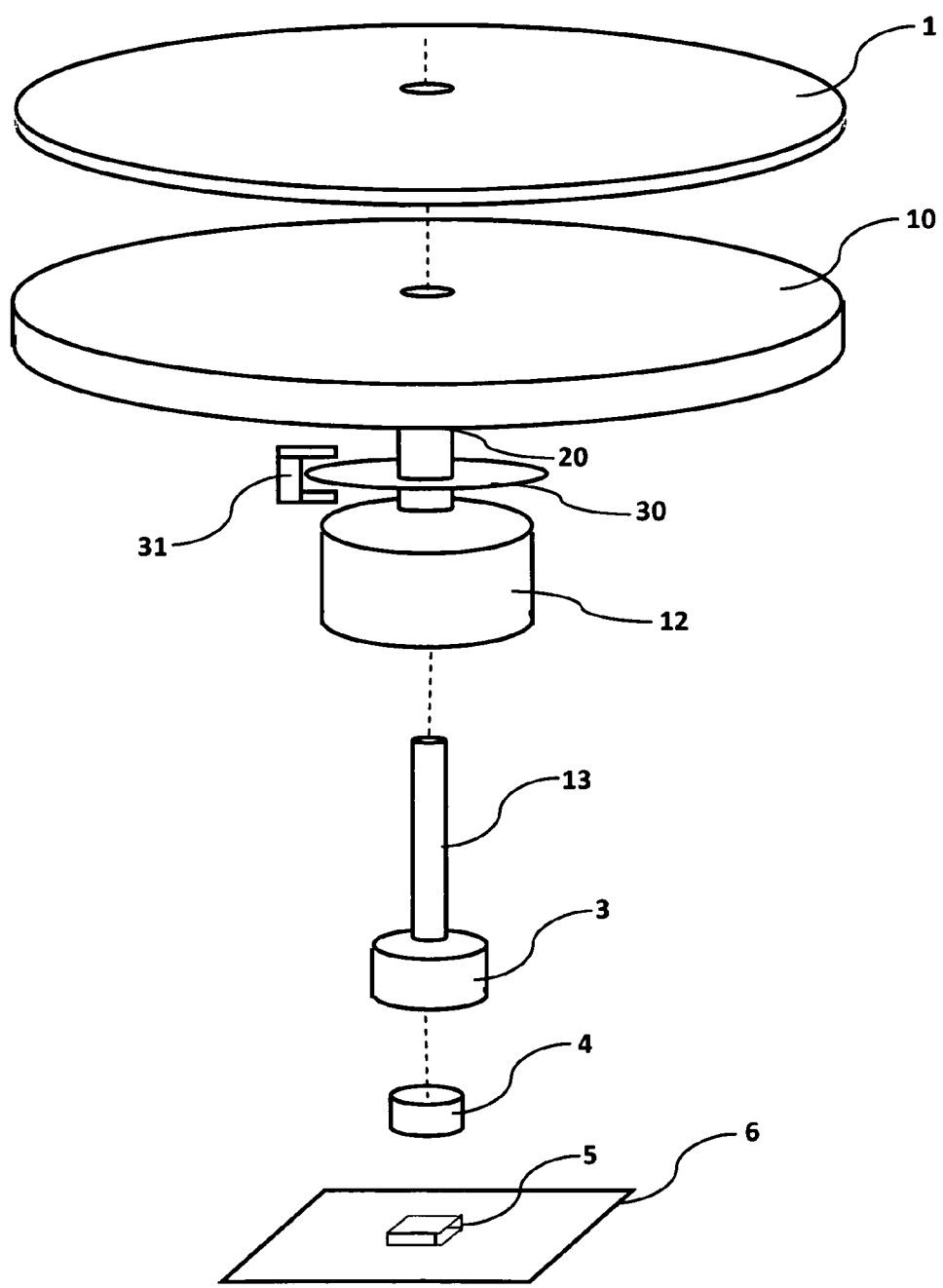
FIG. 6 is a partially exploded perspective view an embodiment of the present invention that includes a motorized platter with an optical encoder and sensor used to determine the rotational position and rotational direction of the platter.

Referring to FIG. 5 and FIG. 6, both shows the user rotatable member 1 coupled to the magnet 4 through shaft 13 with detector 5 deriving rotational state information from the rotation movement of the magnet 4. In addition, FIG. 5 and FIG. 6 use an optical encoder 30 operationally coupled to the platter 10. An optical sensor 31 determines rotational position and relative direction information of the platter 10. The optical encoder 30 is attached to an outer hollow outer shaft 20 that is operationally attached to the platter so that the encoder 30, hollow outer shaft 20, and platter 10 all rotate together. The user rotatable member 1 is operationally attached to the magnet 4 through inner shaft 13 and holder 3. Inner Shaft 13 rotates within a bearing mounted on the inside of the outer shaft 20 so that platter 10 and user rotatable member 1 can rotate independently.

Referring to FIG. 6, in addition to the elements and their interrelations described in the last paragraph, a motor 12 is operationally attached to hollow outer shaft 20. The motor 20 rotates both the hollow outer shaft 20 and the platter 20.

Figure 7:
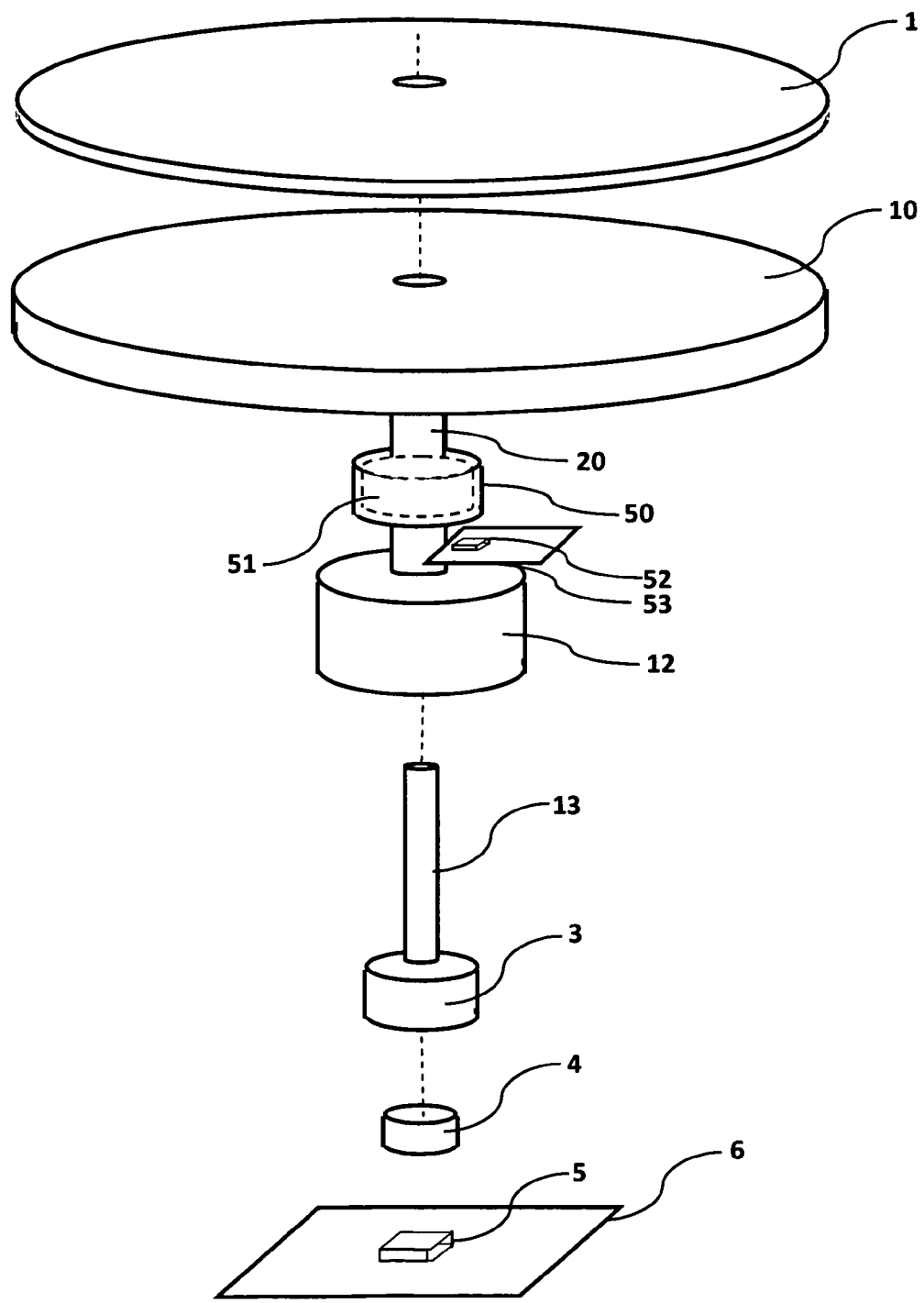
FIG. 7 is a partially exploded perspective view of an embodiment of the invention that includes a motorized platter with a second magnet and second sensor that are used to determine the rotational state of the platter.

Referring to FIG. 7, the user rotatable member 1 coupled to the magnet 4 through shaft 13 with detector integrated circuit 5 deriving rotational state information from the rotation movement of the magnet 4. A hollow outer shaft 20 is operationally attached to a platter 10, so that the platter and shaft rotate together. In addition, a second magnet 51 is rigidly attached to outer shaft 20. The second magnet 51 has a central hole proportioned to receive the outer shaft 20. In additional the magnet is mounted inside a holder 50. A second detector integrated circuit 52 is mounted on a second PC board 53. The second detector integrated circuit 52 derives the rotational state information from the platter.

A motor 12 is attached to the outer shaft 20 at opposite ends to the platter 10. The motor rotates both the shaft and the platter. The motor is hollow in the center in order to receive inner shaft 13.

Another embodiment, not shown, is identical to that of FIG. 7 except the motor is removed. In this embodiment, both the platter 10 and user rotatable member 1 are rotated by the user. The movement of the user rotatable member 1 is detected by detector integrated circuit 5, while the movement of the platter is detected by second detector integrated circuit 52.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. An apparatus, comprising:
   a shaft including a first end and a second end;
   a magnet connected to the first end of said shaft;
   a user rotatable member operatively engaged to the second end of said shaft and operatively connected to said magnet whereby rotation of said member produces a corresponding rotation of said magnet;
   a detector which determines a rotational state of said magnet, including information for determining a rotational position and rotational direction of said magnet; and
   processing means adapted for manipulating digital audio, said processing means manipulating a digital audio signal based on the rotational position and the rotational direction derived from the rotational state determined by said detector.

2. An apparatus of claim 1, wherein said processing means manipulates a digital audio signal in order to produce a scratch effect from the rotational position and the rotational direction derived from the rotational state determined by said detector.

3. An apparatus of claim 1, wherein said processing means is contained within a personal computer.

4. An apparatus of claim 1, further comprising a housing and wherein said processing means and said member are contained by said housing.

5. An apparatus of claim 1, wherein said detector determines absolute position; and
   said processing means manipulates the digital audio signal based on the absolute position determined by the detector.

6. An apparatus of claim 1, further comprising a rotatable platter, wherein said member impinging against said platter and rotatable about a common axis.

7. An apparatus of claim 6, further comprising a motor, wherein said platter is rotationally driven by said motor.

8. An apparatus, comprising:
   a shaft including a first end and a second end;
   a magnet connected to the first end of said shaft;
   a user rotatable member operatively engaged to the second end of said shaft and operatively connected to a magnet whereby rotation of said member produces a corresponding rotation of said magnet;
   a detector which determines a rotational state of said magnet, including information for determining a rotational position and rotational direction of said magnet;
   a controller which processes rotational state information from said detector for transmission by standard computer protocol; and
   processing means for manipulating digital audio, which manipulates a digital audio signal based on the information for determining the rotational position and the rotational direction from said detector.

9. An apparatus of claim 8, wherein said processing means manipulates a digital audio signal in order to produce a scratch effect based on the information for determining the rotational position and the rotational direction from said detector.

10. An apparatus of claim 8, wherein the processing means is contained within a personal computer.

11. An apparatus of claim 8, wherein the standard computer protocol is USB.

12. An apparatus of claim 8, wherein the standard computer protocol is FireWire (IEEE-1394).

13. An apparatus of claim 8, wherein the standard computer protocol is a wireless protocol.

14. An apparatus of claim 8, wherein said detector and said controller are contained within a same integrated circuit.

15. An apparatus of claim 8, wherein said detector determines absolute position; and
said processing means manipulates the digital audio signal based on the absolute position determined by the detector.

16. An apparatus of claim 8, further comprising a rotatable platter, wherein said member impinges against said platter and rotatable about a common axis.

17. An apparatus of claim 16, further comprising a motor, wherein said platter is rotationally driven by said motor.

* * * * *